(12) United States Patent
Karp

(10) Patent No.: US 7,812,674 B2
(45) Date of Patent: Oct. 12, 2010

(54) COMMON CENTROID ELECTROSTATIC DISCHARGE PROTECTION FOR INTEGRATED CIRCUIT DEVICES

(75) Inventor: James Karp, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 79 days.

(21) Appl. No.: 12/323,122

(22) Filed: Nov. 25, 2008

(65) Prior Publication Data

US 2010/0127782 A1    May 27, 2010

(51) Int. Cl.
*H03F 1/52* (2006.01)

(52) U.S. Cl. .................................. 330/298; 330/307

(58) Field of Classification Search ............. 330/207 P, 330/298, 307
See application file for complete search history.

(56) References Cited

U.S. PATENT DOCUMENTS 6,526,548 B1   2/2003  Voldman
7,532,076 B2 *  5/2009  Hanada et al. .............. 330/298
2004/0189350 A1  9/2004  Morimoto et al.
2009/0296293 A1 * 12/2009  Ker et al. .................... 361/56

FOREIGN PATENT DOCUMENTS

GB          2 404 509 A    2/2005

* cited by examiner

*Primary Examiner*—Steven J Mottola
(74) *Attorney, Agent, or Firm*—Kevin T. Cuenot; LeRoy D. Maunu

(57) ABSTRACT

A method of protecting a circuit design implemented within an integrated circuit (IC) from electrostatic discharge (ESD) can include positioning a device array pair comprising first and second device arrays on the IC to share a common centroid, wherein the first and second device arrays are matched. An ESD diode array pair comprising first and second ESD diode arrays can be positioned on the IC adjacent to a first perimeter encompassing the first and second device arrays, wherein the first and second ESD diode arrays share the common centroid and are matched. A cathode terminal of each ESD diode of the first ESD diode array can be coupled to an input of the first device array, and a cathode terminal of each ESD diode of the second ESD diode array can be coupled to an input of the second device array.

20 Claims, 5 Drawing Sheets

COMMON CENTROID ELECTROSTATIC DISCHARGE PROTECTION FOR INTEGRATED CIRCUIT DEVICES

FIELD OF THE INVENTION

The embodiments disclosed herein relate to integrated circuit (IC) devices. More particularly, the embodiments relate to protecting matched input devices within an IC from electrostatic discharge (ESD) events.

BACKGROUND

An electrostatic discharge (ESD) event refers to a temporary and abrupt flow of current between two objects of differing electrical potentials. ESD can be a serious issue for solid state electronic integrated circuits (ICs) as large potential changes and instantaneous current flows that occur during the ESD event can damage silicon junctions and oxide insulators. Typically, damage to an IC from the ESD event can diminish the performance of a silicon-based IC, if not render the IC unusable.

A buildup of charge on an object may occur for a variety of different reasons, many of which occur during the manufacturing and assembly of ICs. As a result, ICs may be subjected to inadvertent ESD events prior to assembly and sale. To protect against ESD events, ESD protection schemes are implemented at nodes of the IC that may come in contact with external objects, e.g., nodes coupled to input pins of the IC. These ESD protection schemes seek to prevent the buildup of large electrical potentials within sensitive sections of the IC. In addition, ESD protection schemes can provide alternative pathways for a large current flow that can occur during ESD events. These alternative pathways attempt to steer current around sensitive internal circuits, effectively bypassing the sensitive sections of the IC.

SUMMARY

The embodiments disclosed herein relate to integrated circuits (ICs). One embodiment of the present invention can include a method of protecting a circuit design implemented within an IC from electrostatic discharge (ESD). The method can include positioning a device array pair including a first device array and a second device array on the IC to share a common centroid. The first device array and the second device array can be matched. An ESD diode array pair including a first ESD diode array and a second ESD diode array can be positioned on the IC adjacent to a first perimeter encompassing the device array pair. The first ESD diode array and the second ESD diode array can share the common centroid and can be matched. The method also can include coupling a cathode terminal of each ESD diode of the first ESD diode array to an input of the first device array and coupling a cathode terminal of each ESD diode of the second ESD diode array to an input of the second device array.

The method can include coupling an anode terminal of each ESD diode of the ESD diode array pair to a ground potential of the IC via a P-type connector array pair including a first P-type connector array and a second P-type connector array.

In one aspect, the first P-type connector array can be positioned to encompass the first perimeter. The second P-type connector array can be positioned to encompass a second perimeter. The second perimeter can encompass the ESD diode array pair.

In another aspect, the first P-type connector array can be positioned to surround a first half of the ESD diodes of the first ESD diode array and a first half of the ESD diodes of the second ESD diode array. The second P-type connector array can be positioned to surround a second half of the ESD diodes of the first ESD diode array and a second half of the ESD diodes of the second ESD diode array.

The method can include positioning an additional device array adjacent to a third perimeter encompassing the second P-type connector array. The additional device array can share the common centroid.

Each device of the device array pair can be implemented as a matched device. Each ESD diode of the ESD diode array pair can be implemented as a matched device. Positioning an ESD diode array pair can include implementing each ESD diode array of the ESD diode array pair as a P-well diode. An anode of each P-well diode can be formed of a P-type material and a cathode of each P-well diode can be formed of an N-type material.

Another embodiment of the present invention can include a system for protecting a circuit design implemented within an IC from electrostatic discharge. The system can include a device array pair including a first device array and a second device array positioned on the IC sharing a common centroid. The first device array and the second device array can be matched. The system can include an ESD diode array pair including a first ESD diode array and a second ESD diode array positioned on the IC adjacent to a first perimeter encompassing the device array pair. The first ESD diode array and the second ESD diode array can share the common centroid and can be matched. A cathode terminal of each ESD diode of first ESD diode array can be coupled to an input of the first device array and a cathode terminal of each ESD diode of the second ESD diode array can be coupled to an input of the second device array.

The system can include a P-type connector array pair including a first P-type connector array and a second P-type connector array. The P-type connector array pair can couple an anode terminal of each ESD diode of the ESD diode array pair to a ground potential of the IC.

In one aspect, the first P-type connector array can encompass the first perimeter. The second P-type connector array can encompass a second perimeter. The second perimeter can encompass the ESD diode array pair.

In another aspect, the first P-type connector array can surround a first half of the ESD diodes of the first ESD diode array and a first half of the ESD diodes of the second ESD diode array. The second P-type connector array can surround a second half of the ESD diodes of the first ESD diode array and a second half of the ESD diodes of the second ESD diode array.

The system can include an additional device array positioned on the IC adjacent to a third perimeter encompassing the second P-type connector array. The additional device array can share the common centroid.

Each device of the device array pair can be matched. Each ESD diode of the ESD diode array pair can be matched. Further, each ESD diode of the ESD diode array pair can be a P-well diode. An anode of each ESD diode can be formed of a P-type material and the cathode of each ESD diode can be formed of an N-type material.

Another embodiment of the present invention can include a system for protecting an N-type metal oxide semiconductor (NMOS) differential amplifier implemented within an IC from electrostatic discharge. The system can include an NMOS input device array pair including a first NMOS input device array and a second NMOS input device array, of the differential amplifier. The NMOS input device array pair can be positioned on the IC sharing a common centroid. The first NMOS input device array and the second NMOS input device array can be matched. Each NMOS input device array of the NMOS input device array pair can include a plurality of NMOS input devices, wherein each NMOS input device of the NMOS input device array pair is matched.

The system can include an ESD diode array pair including a first ESD diode array and a second ESD diode array positioned on the IC adjacent to an outer edge of the NMOS input device array pair. The first ESD diode array and the second ESD diode array can share the common centroid and can be matched. Each ESD diode array of the ESD diode array pair can include a plurality of ESD diodes. Each ESD diode of the ESD diode array pair can be matched. A cathode terminal of each ESD diode of the first ESD diode array can be coupled to a gate terminal of each NMOS input device of the first NMOS input device array. A cathode terminal of each ESD diode of the second ESD diode array can be coupled to a gate terminal of each NMOS input device of the second NMOS input device array.

The system further can include a P-type connector array pair including a first P-type connector array and a second P-type connector array. The P-type connector array pair can couple the anode terminal of each ESD diode to the ground potential of the IC.

In one aspect, the first P-type connector array can surround a first half of the ESD diodes of the first ESD diode array and a first half of the ESD diodes of the second ESD diode array. The second P-type connector array can surround a second half of the ESD diodes of the first ESD diode array and a second half of the ESD diodes of the second ESD diode array.

In another aspect, the first P-type connector array can encompass the NMOS input device array pair. The second P-type connector array can encompass the ESD diode array pair.

The system can include an NMOS current source device array positioned adjacent to a perimeter encompassing the ESD diode array pair. The NMOS current source device array can share the common centroid. Each NMOS current source device of the NMOS current source device array can be matched. A drain terminal of each NMOS current source device of the NMOS current source device array can be coupled to a drain terminal of each other NMOS current source device of the NMOS current source device array as well as a source terminal of each NMOS input device of the NMOS input device array pair.

Each ESD diode of the ESD diode array pair can be a P-well diode. An anode of each ESD diode can be formed of a P-type material and the cathode of each ESD diode can be formed of an N-type material.

DETAILED DESCRIPTION OF THE DRAWINGS

Figure 1:
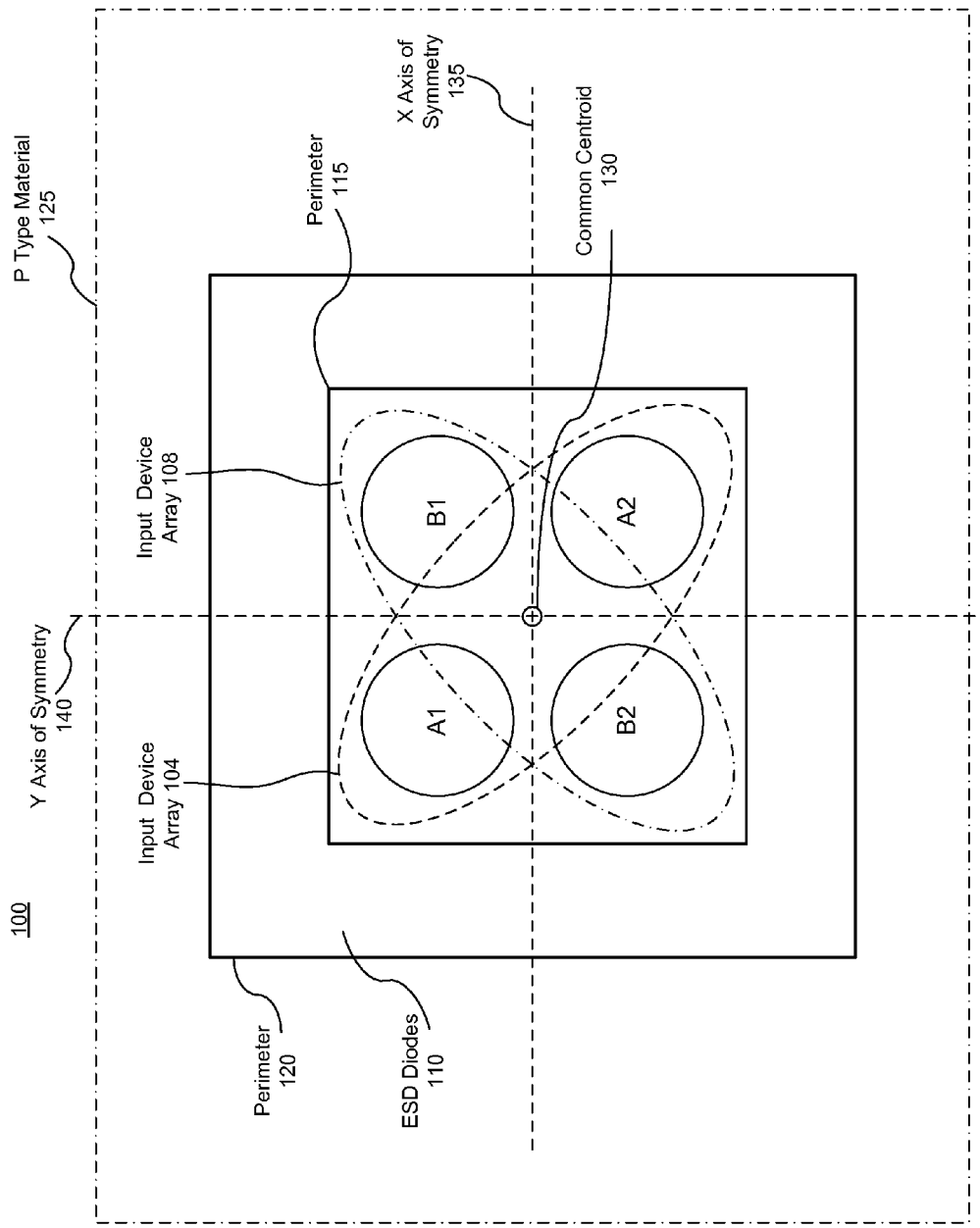
FIG. 1 is a first block diagram illustrating a layout for electrostatic discharge (ESD) protection of an integrated circuit (IC) in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed within this specification relate to electrostatic discharge (ESD) protection for an integrated circuit device (IC). More particularly, the embodiments provide an improved layout for ESD protection for an IC that relies upon common centroid patterns. In accordance with the inventive arrangements disclosed herein, a pair of matched devices, each coupled to an input node of the IC, referred to as "input devices," can be positioned in a common centroid pattern. As the input devices may be vulnerable to ESD events, ESD diodes can be coupled to input nodes of the input devices to provide ESD protection to the input devices.

In order to preserve the improved matching characteristics of the common centroid pattern of the input devices, a perimeter encompassing the input devices can be determined. ESD diodes can be positioned adjacent to that perimeter in a manner that retains the common centroid location for both the input devices and the ESD diodes. This arrangement provides several benefits such as improved matching characteristics for the input devices. The ESD diodes will also be located closer to the input devices being protected, thereby improving ESD protection. With improved ESD protection, the size of the ESD diodes can be reduced. As a result of the reduced ESD diode size, the impedance seen at the input nodes can be reduced, thereby improving return loss and high frequency performance of the IC.

The embodiments disclosed within this specification can be implemented within a variety of different types of ICs, whether custom ICs, application specific integrated circuits (ASICs), mixed signal ICs, or programmable ICs. Programmable ICs are a type of IC that can be programmed to perform specified logic functions.

Examples of programmable ICs can include Field Programmable Gate Arrays (FPGAs), Complex Programmable Logic Devices (CPLDs), Programmable Logic Arrays (PLAs), and Programmable Array Logic (PAL) devices. Within these devices, the functionality of the device can be controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other examples of programmable ICs can include those programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC," as used within this specification, can include, but is not limited to, these devices, and may encompass devices that are only partially programmable. For example, one type of programmable IC can include a combination of hard-coded transistor logic and a programmable switch fabric that programmably interconnects the hard-coded transistor logic.

FIG. 1 is a first block diagram illustrating a layout 100 for ESD protection of an IC in accordance with one embodiment of the present invention. As shown, FIG. 1 illustrates a circuit design having a plurality of devices arranged in a common centroid pattern. Layout 100 can provide improved ESD protection for input devices while also maintaining the improved device matching characteristics provided by common centroid layout patterns. As used within this specification, a "layout" or "IC layout," can refer to a representation of an IC in terms of planar geometric shapes which correspond to the design masks that pattern the metal layers, the oxide regions, the diffusion areas, or other layers that make up devices of the IC. Layout 100 can include input device array 104, input device array 108, ESD diodes 110, and P-type material 125.

Input device arrays 104 and 108 can be implemented as a plurality of transistors, a plurality of resistors, a plurality of capacitors, or a plurality of any other device that can be implemented on an IC and which, when used at an input node of the IC, may require some level of device matching. The phrase "matched devices" or "matching devices," as used within this specification, can refer to two or more devices for which the type, value, relative location, and size of each device is designed to be equal, or near equal, in order to maintain the symmetry and performance of a circuit design within which the matched devices are utilized. For example, type, value, and size of matched devices may vary with respect to tolerances of the IC fabrication process. The relative location of matched devices is described in greater detail below with reference to common centroids.

As the performance of many electronic circuits depends upon the symmetry of the circuit design, it can be important that like components within the circuit design match in size, value, and performance. As the IC fabrication process is not ideal, variation in component size, value, and function are to be expected. For this reason, a number of strategies can be used to overcome sources of device mismatch.

Common centroid layout patterns can be used to prevent mismatch in devices. In a common centroid layout, two matching devices each can be implemented as an array of at least two devices, e.g., input device arrays 104 and 108. Within the device array pair formed of input device arrays 104 and 108, each device is matched. The devices within the pair of device arrays may be intermingled such that an axis of symmetry along the X axis and an axis of symmetry along the Y axis of each input device array intersect at a common point or centroid.

As used within this specification, an "axis of symmetry" for an array of devices represents a dividing line separating the active surface area of the array of devices into equal halves existing on either side of the axis of symmetry. The term "centroid," as used within this specification, e.g., common centroid 130 in FIG. 1, can refer to an intersection of the X axis of symmetry, e.g., X axis of symmetry 135, and the Y axis of symmetry, e.g., Y axis of symmetry 140, of an array of devices. When the axis of symmetry in both the X and Y coordinate planes is shared by two different device arrays, the intersection of the X and Y axes of symmetry will be shared between the two arrays. When the intersection of the X and Y axes of symmetry is common between the two arrays, the arrays can be said to share a common centroid.

Referring to FIG. 1, input device array 104 contains devices A1 and A2 and an input device array 108 contains devices B1 and B2. Input device arrays 104 and 108, taken together, can be called a "device array pair." Devices A1, A2, B1, and B2 are matched devices, e.g., of a same device type, size, and value. Input device array 104 and input device array 108 can be arranged on the IC such that devices A1, A2, B1, and B2 are positioned along two horizontal rows, with each row containing two devices. The devices can be commingled such that devices A1 and B1 are positioned sequentially in the first row and devices B2 and A2 are positioned sequentially in the second row. With each of matched devices A1, A2, B1, and B2 being equidistant from each other device and the devices within each of input device arrays 104 and 108 being positioned on a diagonal to each other, the centroid of both input device arrays 104 and 108 will be common centroid 130. Using this approach, device arrays of various sizes can be implemented as device arrays sharing a common centroid. Accordingly, device mismatch effects resulting from device manufacturing process variation and localized thermal variation can be reduced.

Each of the devices A1 and A2 of input device array 104 can be coupled in parallel, e.g., with like device terminals coupled together as one node. Each of devices B1 and B2 of input device array 108 can be coupled in parallel with like device terminals coupled together as one node. When coupled in this manner, each of input device arrays 104 and 108 can function as a single input device. Throughout this specification, the same reference characters are used to refer to terminals, signal lines, wires, nodes, and their corresponding signals. In this regard, the terms "signal," "wire," "connector," "terminal," "node," and "pin" may be used interchangeably, from time-to-time, within the present specification.

A first perimeter 115 can represent a boundary encompassing input device arrays 104 and 108. Perimeter 115 can represent a boundary formed by the outer edges of input device arrays 104 and 108 and by device spacing rules of a particular manufacturing process used to construct input device arrays 104 and 108. The device spacing rules may extend perimeter 115 beyond the outer edges of input device arrays 104 and 108. For example, an IC manufacturing process may require a 10μ (ten micron) spacing between the outer edge of a particular device type used to implement input device arrays 104 and 108, and any other device. In that case, the location of perimeter 115 can be extended beyond the outer edges of input device arrays 104 and 108 to include the 10μ exclusion area required by the device spacing rules.

ESD diodes 110 can be implemented with a variety of different diode devices dependent upon the manufacturing process used to fabricate the IC within which layout 100 is used. For example, ESD diodes 110 can have N-type material for a cathode and P-type material for an anode. ESD diodes 110 can be designed and/or sized to divert a predetermined amount of current flow expected during a particular ESD event. Each of ESD diodes 110 can be of a same device type, size and value, e.g., matching ESD diodes. ESD diodes 110 can be divided into a first and a second array, with each array being formed of one or more pairs of ESD diodes. The first ESD diode array can be coupled to each input of the devices within input device array 104. The second ESD diode array can be coupled to each input of the devices within input device array 108.

ESD diodes 110 can be positioned adjacent to perimeter 115 in a manner that preserves the common centroid pattern of layout 100. As ESD diodes 110 can include two arrays of ESD diodes, the arrays can be arranged such that the centroid of each array is located at common centroid 130, the same centroid as each of input device arrays 104 and 108. Having each ESD diode array of ESD diodes 110 and each of input device arrays 104 and 108 sharing common centroid 130 helps ensure that matching characteristics of input device arrays 104 and 108 are retained, while simultaneously providing ESD protection to input device arrays 104 and 108.

In another aspect, ESD diodes 110 can be positioned adjacent to the input device arrays 104 and 108. Typically, an ESD diode is positioned near the input pad of the IC, or another available space that is not collocated with input device arrays 104 and 108. Metal is routed to couple the ESD diodes to each input device being protected. The metal routing contributes resistance to the path of current flowing through the metal during an ESD event. Accordingly, a voltage differential can be expected between the ESD diode and the input device as a result of current flow across the resistance of the metal routing path coupling the ESD diode to the input device. As known, the voltage drop will be a function of the resistance of the metal route and the amount of current flowing. Thus, the greater the distance between the ESD diode and the node being protected, the larger the voltage drop between the two nodes. The voltage drop across the metal routing path can result in the voltage at the ESD diode differing from the voltage at the input device. The differing voltages seen at the ESD diodes and the input device can result in the ESD diode failing to turn on at a voltage level adequate to protect the input device from the ESD event.

Placing ESD diodes 110 near input device arrays 104 and 108 can improve the ESD performance of ESD diodes 110, thereby allowing a reduction in the size of ESD diodes 110. The reduced size of ESD diodes 110 can decrease the capacitance associated with ESD diodes 110. Accordingly, placing ESD diodes 110 near input device arrays 104 and 108, e.g., within a predetermined distance, can decrease the impedance seen at an input node to which ESD diodes 110 and input device arrays 104 and 108 may be coupled together. In another embodiment, ESD diodes 110 can be placed at a location such that the wire route coupling ESD diodes 110 to the input devices being protected has less than a predetermined minimum resistance.

A second perimeter 120 can represent a boundary encompassing input device arrays 104 and 108, and ESD diodes 110. Any additional devices, and/or array(s) of devices, required for layout 100 can be positioned adjacent to perimeter 120. Further, the additional devices, and/or array(s) of devices, can be arranged such that the centroids of the additional devices are the same as common centroid 130. In this manner, the symmetry and matching characteristics of layout 100 can be retained.

Figure 2:
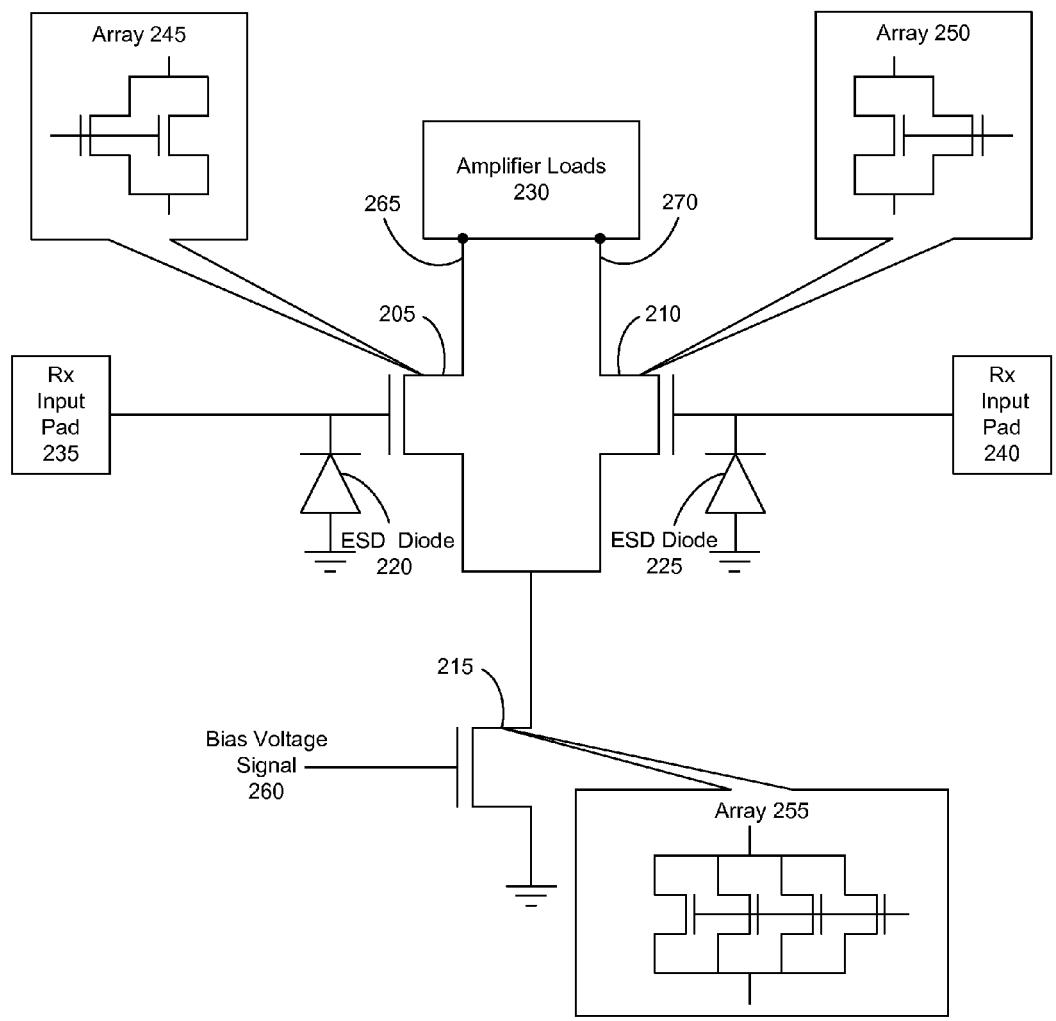
FIG. 2 is a circuit diagram illustrating a differential amplifier circuit with ESD protection in accordance with another embodiment of the present invention.

FIG. 2 is a circuit diagram illustrating a differential amplifier circuit 200 with ESD protection in accordance with another embodiment of the present invention. Circuit 200 illustrates an example of a circuit having matched input devices arranged according to the layout described with reference to FIG. 1. More particularly, circuit 200 illustrates an embodiment of a differential amplifier using N-type metal oxide semiconductor (NMOS) input devices.

For purposes of illustration, circuit 200 is shown with a differential amplifier, e.g., a high speed receiver. It should be noted, however, that although implemented with NMOS input devices in FIG. 2, the ESD protection described with respect to FIG. 1 can be implemented with any matched devices using a common centroid layout. As such, the use of NMOS input devices in circuit 200 is not intended to limit the embodiments disclosed within this specification.

Circuit 200 can include an input device 205, an input device 210, a current device 215, an ESD diode 220, an ESD diode 225, amplifier loads 230, an Rx (receiver) input pad 235, and an Rx input pad 240, coupled together as shown in FIG. 2. As known, the structure of the NMOS differential amplifier is symmetric. This requires accurate matching of symmetric devices, e.g., input devices 205 and 210, within circuit 200. Accurate matching of symmetric devices can improve amplifier performance, as well as provide reproducible amplifier performance across different manufacturing process runs.

Matching requirements can be especially critical for input devices 205 and 210 of circuit 200. Mismatches related to input devices 205 and 210 can result in poor common mode gain rejection and DC offsets at the amplifier outputs corresponding to nodes 265 and 270. To improve matching, the input devices 205 and 210 can be arranged using a common centroid layout pattern. Each NMOS differential amplifier input device 205 and 210 can be implemented as an array of NMOS devices such that each input NMOS device array can be arranged to share a common centroid.

The input of input device 205 can be coupled to, and receive signals from, Rx input pad 235. The input of input device 210 can receive be coupled to, and receive signals from, Rx input pad 240. Rx input pads 235 and 240 can be coupled to package pins which can extend outward from the external surface of the IC package. As such, input devices 205 and 210 may be exposed to external ESD events.

Input device 205 functionally represents one input device of the differential amplifier and input device 210 functionally represents a complementary input device of the differential amplifier. Input devices 205 and 210 each can be implemented as an array of smaller matched devices shown as arrays 245 and 250 respectively. Array 245 and 250, taken together, can be regarded as a device array pair. Each device in a particular array, e.g., array 245, can be coupled together in parallel, thereby functioning as a single larger device, e.g., input device 205. As described within this specification, arrays 245 and 250 can be positioned on an IC substrate such that array 245 and array 250 share a common centroid.

Current device 215 provides a bias current to input devices 205 and 210. The bias current level is set by the voltage level of bias voltage signal 260. The bias current can be used to drive amplifier loads 230 by altering the bias current flow between input device 205 and input device 210. The current flow through input devices 205 and 210 varies in response to alterations in the differential voltage applied across Rx input pads 235 and 240.

In order to maximize matching in the differential amplifier, an array of current devices, e.g., array 255, can be implemented for current device 215. In circuit 200, ESD diodes 220 and 225 can be positioned between current source 215 and input devices 205 and 210 in the layout for circuit 200. ESD diodes 220 and 225 each can be implemented as an array. Taken collectively, ESD diodes 220 and 225 can be called a "ESD diode array pair." ESD diode 220 can be coupled to a gate terminal of input device 205 and ESD diode 225 can be coupled to a gate terminal of input device 210.

As will be appreciated by one skilled in the art, the gate terminal of an NMOS device is separated from the NMOS device channel by a thin isolating layer that can be ruptured when exposed to excessive voltage potentials. As an ESD event can result from a large potential differential between two objects, the gate terminal of the NMOS device is especially vulnerable to ESD events.

When input devices 205 and 210 are embodied as NMOS devices, ESD diodes 220 and 225 can provide ESD protection to the gate terminals of input devices 205 and 210 respectively. During an ESD event, responsive to a voltage applied to Rx input pad 235 exceeding the reverse breakdown voltage of ESD diode 220, ESD diode 220 can turn on. Similarly, responsive to a voltage applied to Rx input pad 240 exceeding the reverse breakdown voltage of ESD diode 225, ESD diode 225 can turn on. When ESD diode 220 and/or ESD diode 225 turn on, a path for ESD current to flow away from the input, e.g. a gate terminal of an NMOS device, of input device 205 and/or input device 210 can be provided. When designed properly, ESD diodes 220 and 225 can prevent charge buildup at the inputs of input devices 205 and 210. Sufficient charge buildup at the gate terminals of NMOS devices can generate a voltage potential capable of damaging the gate terminals.

In conventional ESD protection schemes, each ESD diode is located proximate, or adjacent, and coupled to an associated Rx pad at the outer edge of the IC. This means that the ESD diode can be located a substantial distance from the input device it protects. Each ESD diode is then coupled with a metal line to an associated input device. The inherent resistance of the metal line can result in voltage changes along the metal line as ESD current moves though the metal line. As ESD events can involve large instantaneous current flows, any significant resistance in the metal line between each input device and the associated ESD diode coupled to that input device can result in large voltage differentials between the input device and the ESD diode during the ESD event.

For example, ESD diode 220 can be coupled to input device 205 via a metal wire or route. The metal wire can contain 10 ohms of resistance. An ESD event can occur with a peak instantaneous current of 10 amps. During the peak current, the voltage drop along the metal wire can be 100 volts. The 100 volt change along the metal line can create a 100 volt differential between the voltage at ESD diode 220 and the voltage at input device 205. The voltage differential can result in poor ESD protection as the voltage at ESD diode 220, intended to protect input device 205, will be at a vastly different voltage potential than the gate of input device 205.

In circuit 200, ESD diodes 220 and 225 are positioned adjacent to, or within a predetermined distance of, input devices 205 and 210. This layout minimizes the impedance of the metal wire coupling ESD diode 220 to input device 205 and the metal wire coupling ESD diode 225 to input device 210. The placement of ESD diodes 220 and 225 adjacent to the associated input devices 205 and 210 can improve ESD performance, allowing a reduction in the size of ESD diodes 220 and 225. In addition to being adjacent to input devices 205 and 210, each of ESD diodes 220 and 225 can be implemented as an array of matched ESD diodes. Each array of ESD diodes 220 and 225 can be arranged to have a common centroid with input devices 205 and 210. The common centroid of each array of devices in circuit 200 can lead to greater symmetry and matching in circuit 200. Conventional ESD protection schemes that position the ESD diodes at the input pins of the IC can violate the input symmetry of a common centroid design, as the ESD diodes are not positioned to share the common centroid of the input devices.

Figure 3:
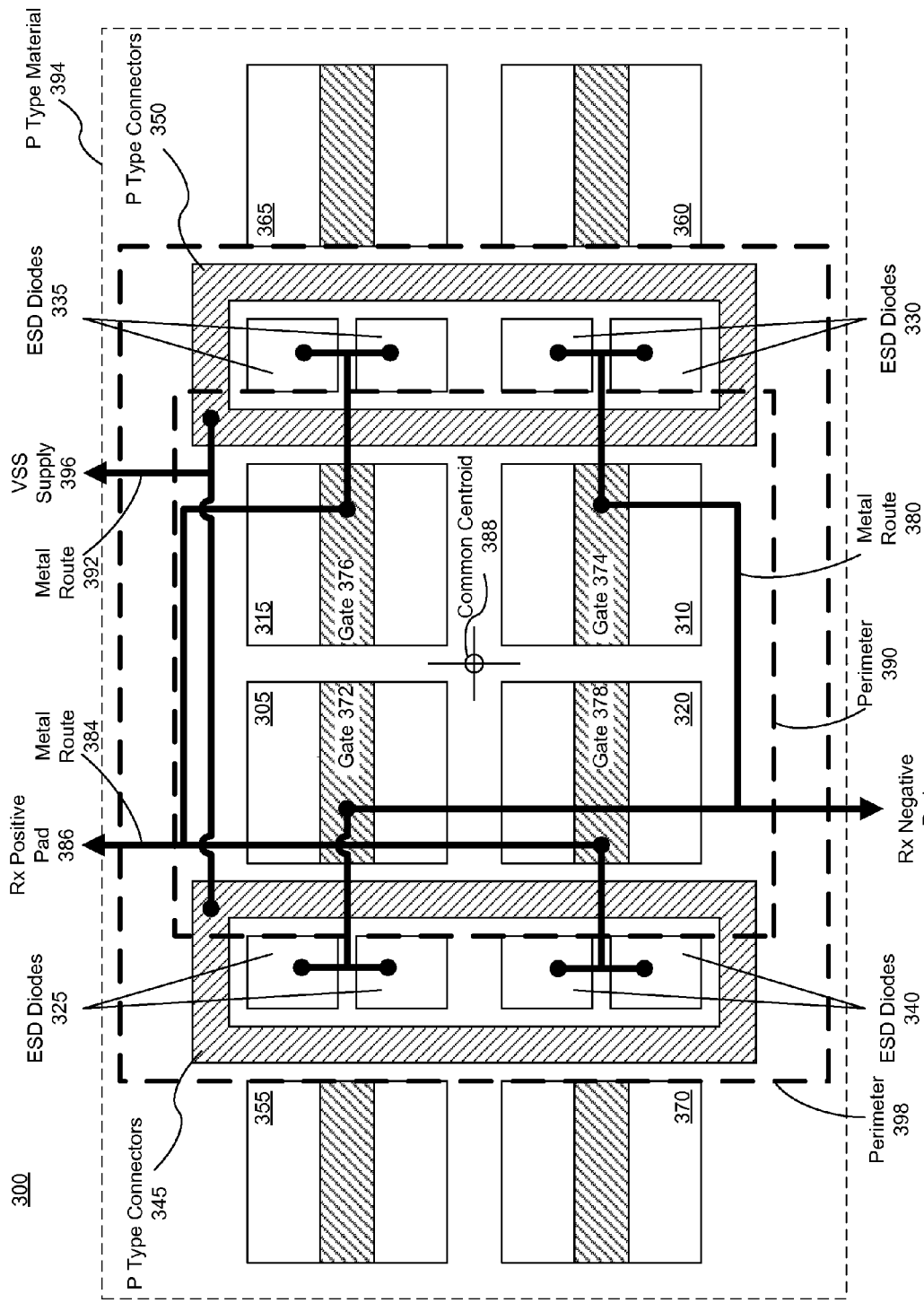
FIG. 3 is a second block diagram illustrating a layout of a differential amplifier in accordance with another embodiment of the present invention.

FIG. 3 is a second block diagram illustrating a layout 300 of a circuit (e.g., a differential amplifier) in accordance with another embodiment of the present invention. Layout 300 illustrates an approach to ESD protection that provides improved ESD protection to the input NMOS devices of a differential amplifier while maintaining a common centroid pattern for the circuit. Layout 300 can include an input device 305, an input device 310, an input device 315, and an input device 320. Layout 300 further can include ESD diodes 325, ESD diodes 330, ESD diodes 335, and ESD diodes 340. In addition, layout 300 can include P-type connectors 345, P-type connectors 350, and current devices 355, 360, 365, and 370. Each of current devices 355-370 can be implemented as an NMOS transistor.

Input devices 305-320 can be NMOS transistors arranged in a common centroid pattern. Input devices 305-320 can be matched devices, e.g., of a same device size, type, and value, that function as the input devices of a differential amplifier, for example. Input devices 305 and 310 can be coupled in parallel by metal route 380. Metal route 380 can couple input devices 305 and 310 to Rx negative pad 382, which can be an input pad to an IC within which layout 300 is included. Input devices 315 and 320 can be coupled in parallel by metal route 384. Metal route 384 can couple input devices 315 and 320 to Rx positive pad 386, which can be another input pad to the IC.

Input devices 305 and 310 form a first array of devices functioning as one input to the differential amplifier. Input devices 315 and 320 form a second array of devices functioning as a complementary input to the differential amplifier. The array of input devices 305 and 310 and the array of input devices 315 and 320 form a two by two matrix with the pair of devices of each array being positioned at opposing corners of the matrix, e.g., diagonal with respect to one another. Each pair of devices of the two arrays can be aligned along perpendicular diagonals. In such an arrangement, both arrays share a same centroid, e.g., common centroid 388.

Through metal route 380, cathodes of ESD diodes 325 and 330 can be coupled in parallel. Further, the cathode of ESD diodes 325 and 330 can be coupled to gates 372 and 374 of input devices 305 and 310 respectively. As such, ESD diodes 325 and 330 form an array of four ESD diodes that can be coupled to Rx negative pad 382. Similarly, cathodes of ESD diodes 335 and 340 can be coupled in parallel to gates 376 and 378 of input devices 315 and 320 respectively via metal route 384. As such, ESD diodes 335 and 340 form an array of four ESD diodes that can be coupled together at the input of Rx positive pad 386. Each array of ESD diodes, e.g., ESD diodes 325 and 330 and ESD diodes 335 and 340, can be arranged such that each array has a centroid at common centroid 388.

ESD diodes 325-340 can be located proximate to the gate of each of input devices 305-320 to which each of ESD diodes 325-340 is associated. For example, ESD diodes 325 can be positioned adjacent to the gate 372 of input device 305, thereby minimizing metal route 380 and maximizing the ESD protection provided to input device 305. ESD diodes 335 can be positioned adjacent to gate 376. ESD diodes 330 can be positioned adjacent to gate 374. ESD diodes 340 can be positioned adjacent to gate 378.

A first perimeter 390 can encompass input devices 305-320. In layout 300, perimeter 390 can extend beyond the physical dimensions of input devices 305-320. As noted, although perimeter 390 can extend, at a minimum, to the physical border of input devices 305-320, issues such as layout design rules and circuit performance requirements can influence the final location of perimeter 390.

For example, in layout 300, ESD diodes 325 can be positioned adjacent to perimeter 390. A space exists between ESD diodes 325 and P-type connectors 345. In addition, a space exists between P-type connectors 345 and input device 305. The spaces between P-type connectors 345 and ESD diodes 325, and between P-type connectors 345 and input device 305, typically are included to satisfy process design rules that assure reproducible manufacturing of these devices. Further, as anodes of ESD diodes 325 can be composed of P-type material 394, P-type connectors 345 can surround ESD diodes 325 to assure a low impedance path for ESD current through ESD diodes 325. Accordingly, perimeter 390 can encompass the input devices 305-320, a segment or channel of both P-type connectors 345 running between the input devices 305, 320 and ESD diodes 325, 340, a segment or channel of P-type connectors 350 running between the input devices 315, 310 and ESD diodes 335, 330, and any additional spacing required by the design rules of the IC manufacturing process used to create layout 300 within an IC.

ESD diodes 325-340 can be implemented with a P-type material 394 as the anode and an N-type material as a cathode. The P-type material 394 can represent a P-type IC substrate or a P-type well within which the IC may be constructed. P-type connectors 345 and 350 can couple metal route 392 to the P-type material 394 of the anodes of ESD diodes 325-340. During an ESD event, ESD current can flow through ESD diodes 325-340 via P-type connectors 345 and 350 along metal route 392 to VSS supply 396. Typically, VSS supply 396 can be a voltage source providing a ground potential of the IC containing layout 300.

The number and size of P-type connectors 345 and 350 and the size and number of ESD diodes 325-340 can be determined by the design rules of the particular process being used, as well as the ESD design requirements for the inputs being protected. For example, a circuit designed to provide protection from a 500 volt (500V) charged device model (CDM) ESD event can require more total area for P-type connectors 345 and 350 and ESD diodes 325-340 than may be necessary to provide protection from a 200 volt (200V) CDM ESD event.

Typically, P-type connectors 345 and 350 are symmetrically distributed adjacent to the perimeter of ESD diodes 325 and 340 and the perimeter of ESD diodes 335 and 330. The size and shape of P-type connectors 345 and 350, however, may vary. The size and shape of P-type connectors 345 and 350 shown in layout 300 are provided for purposes of illustration only and, as such, are not intended to limit the embodiments of the present invention.

A second perimeter 398 can represent a perimeter encompassing input devices 305-320, ESD diodes 325-340, P-type connectors 345 and 350, and any additional device spacing required by the design rules of the IC manufacturing process used to implement layout 300 within the IC. Current devices 355-370 can be positioned adjacent to perimeter 398. The terminals of current devices 355-370 can be coupled in parallel to form an array of four devices functioning as a single current device. The array of current devices 355-370, as arranged in layout 300, can have a centroid at common centroid 388. Although not shown in layout 300, drain terminals of currents devices 355-370 can be coupled to the source terminals of input devices 305-320. In such an arrangement, current sources 355-370 can provide bias current to input devices 305-320.

The number of devices shown in layout 300 is for illustrative purposes only, and is not intended to limit the embodiments disclosed within this specification. Layout 300 can be implemented with arrays of varying size, with each array sharing a common centroid. Layout 300 can also be used for circuits other than differential amplifier circuits.

Figure 4:
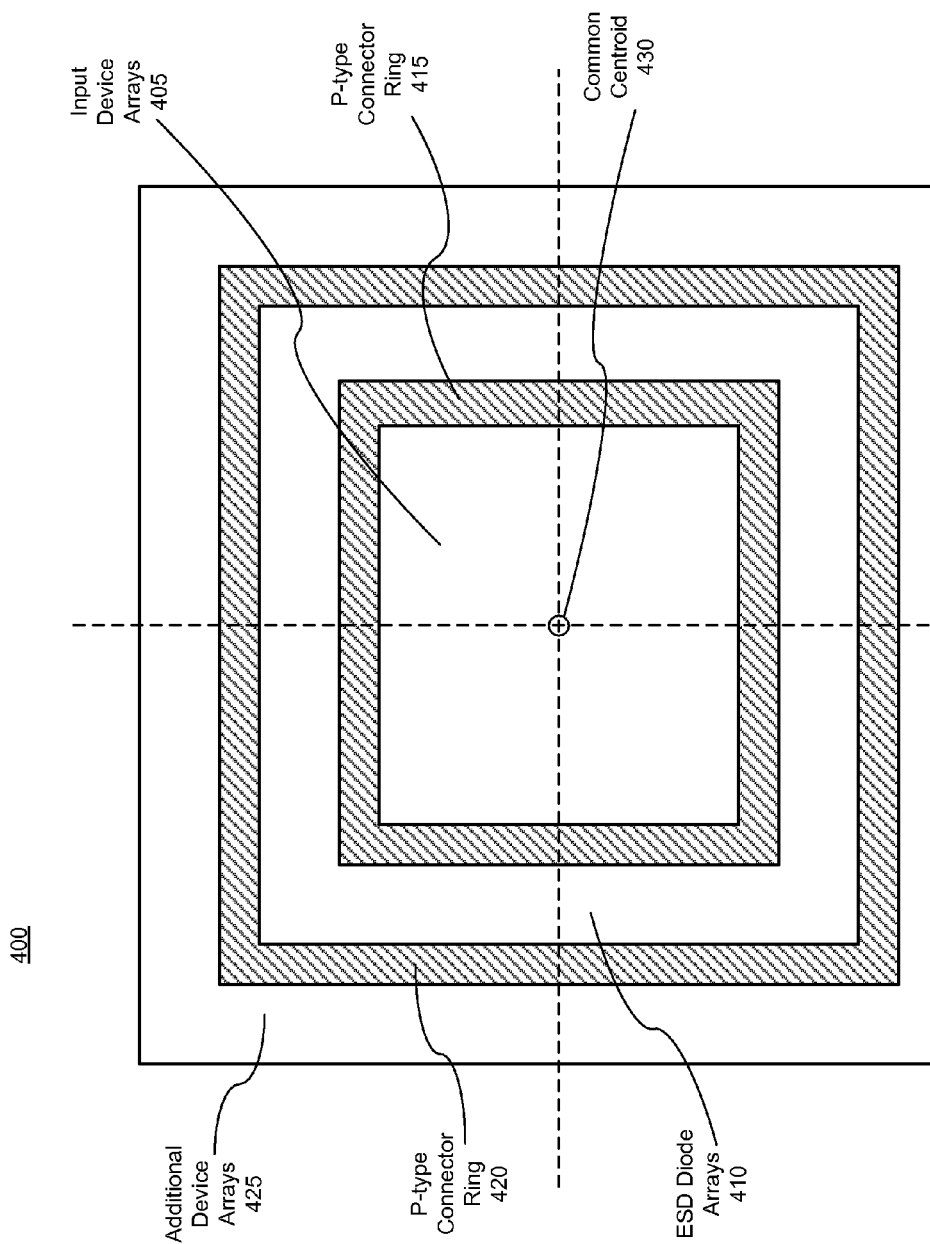
FIG. 4 is a third block diagram illustrating a layout for P-type connector arrays in accordance with another embodiment of the present invention.

FIG. 4 is a third block diagram illustrating a layout 400 for P-type connector arrays in accordance with another embodiment of the present invention. Layout 400 presents an approach to positioning P-type connectors within a circuit design implemented using common centroid patterned device arrays. Layout 400 illustrates an approach to positioning P-type connectors within a circuit design that provides ESD protection, while maintaining the common centroid patterns of input device array pairs implemented within layout 400. Layout 400 can include input device arrays 405, ESD diode arrays 410, a P-type connector ring (P-type ring) 415, a P-type connector ring (P-type ring) 420, and additional device arrays 425.

In layout 400, input device arrays 405 can be formed of device array pairs with each device array sharing a common centroid 430. ESD diode arrays 410 can be formed of ESD diode array pairs with each ESD diode array sharing the common centroid 430. ESD diode array 410 can be separated from an inner edge of input device arrays 405 by a concentric ring of P-type connectors, e.g., P-type ring 415. As noted within this specification, P-type connectors contact the P-type material of the anode of each ESD diode to a metal line coupled to a ground potential of the IC. As such, the size and thickness of P-type ring 415 can determine the current carrying capacity of ESD diode arrays 410 during an ESD event. Accordingly, P-type ring 415 can vary dependent upon the level of ESD protection required for a circuit design implemented with layout 400.

Similar to P-type ring 415, P-type ring 420 can surround the outer edge of ESD diode arrays 410 with a concentric ring of P-type connectors. P-type ring 420 can serve a same function and have a similar structure as P-type ring 415.

As the physical parameters of P-type ring 415 and 420 can vary according to the requirements of a particular circuit design, when referring to an object being "adjacent" or "adjacent to" another object, the two objects can be considered to be immediately next to one another without any intervening devices except for connectors such as P-type connectors. Two objects may be adjacent and still be separated by unused circuit area to conform to established design rules. For example, in layout 400, ESD diode arrays 410 can be said to be adjacent to input device arrays 405 despite being separated by P-type ring 415.

Figure 5:
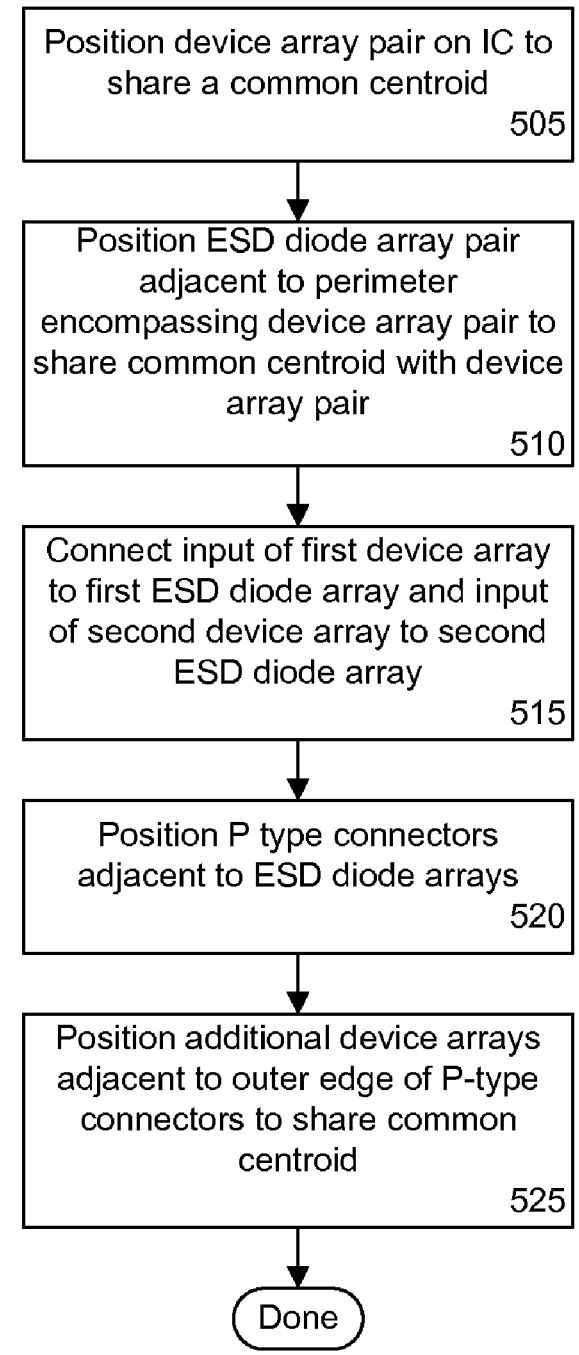
FIG. 5 is a flow chart illustrating a method of providing ESD protection to matched inputs to a differential amplifier within an IC in accordance with another embodiment of the present invention.

FIG. 5 is a first flow chart illustrating a method 500 of protecting a circuit design implemented within an IC from ESD in accordance with another embodiment of the present invention. More particularly, method 500 describes a technique for protecting input devices from ESD events.

Accordingly, in step 505, a matched device array pair can be positioned within the IC to share a common centroid. The device array pair can include a first device array and a second device array. The devices of the device array pair can be matched and arranged such that each device array of the device array pair shares the common centroid.

In another embodiment, the device array pair can be implemented within a pair of interdigitated NMOS devices. As known in the art, an NMOS device is conventionally implemented as a device having a single drain, a single source, and a single gate. As the NMOS device enlarges, this implementation of an NMOS device can lead to wide NMOS devices that may be impractical to position within an IC layout. For this reason, the NMOS device often is implemented with multiple parallel gates and alternating drain and source contacts. The multiple gate NMOS device allows for the creation of a large NMOS device with similar length and width dimensions.

Conventionally, the term "fingers" refers to the gates contained within a particular NMOS device. In an interdigitated NMOS device, alternate fingers of the NMOS device are coupled together to function as two separate NMOS devices within a single NMOS layout structure. Two inputs are coupled to alternating gates terminals of the interdigitated NMOS device; source terminals of the interdigitated NMOS device are shared; and alternate drain terminals of the interdigitated NMOS device are coupled to two different nodes of the IC. In this manner, a single NMOS structure can function as two NMOS devices. Using two such interdigitated NMOS devices, a device array pair can be implemented sharing a common centroid.

In step 510, an ESD diode array pair can be positioned adjacent to a first perimeter encompassing the device array pair. The ESD diode array pair can include a first ESD diode array and a second ESD diode array. Each ESD diode array can be positioned to share the common centroid with the device array pair. Each ESD diode array of the ESD diode array pair can include at least one pair of ESD diodes. Each ESD diode of the ESD diode array pair can be matched with each other ESD diode in the ESD diode array pair. The perimeter may include the device array pair, P-type connectors associated with the ESD diode array pair as well as any other spacing required to meet design rules of the manufacturing process used to implement the circuit design within the IC and/or any additional devices or spacing required to meet performance parameters of the circuit. Positioning the ESD diodes as close to the input node of each device of the device array pair as allowable can improve the ESD protection performance of the IC.

In step 515, a cathode terminal of each ESD diode of the first ESD diode array can be coupled to an input node of the first device array. Additionally, a cathode terminal of each ESD diode of the second ESD diode array can be coupled to an input node of the second device array.

In step 520, an appropriate number of P-type connectors can be positioned adjacent to an outer edge the ESD diode array pair. The P-type connectors can couple an anode of each ESD diode of the ESD diode array pair to a ground potential of the IC. It should be noted that subsequent to the P-type connectors being positioned adjacent to the ESD diode array pair, each ESD diode array can retain the common centroid. The greater the total area of P-type connectors surrounding the ESD diode array pair, the greater the quantity of instantaneous current that can flow through the ESD diodes. As such, larger areas of P-type connectors can result in improved ESD performance for the circuit design.

The manner in which the P-type connectors are positioned adjacent to the ESD diode array pair can vary. For example, in FIG. 3 the ESD diodes of the first ESD diode array and the second ESD diode array can be arranged to be evenly distributed between two groups of ESD diodes. Each group of ESD diodes can contain one half of the ESD diodes of the first ESD diode array and one half of the ESD diodes of the second ESD diode array. Each group of ESD diodes can be surrounded by a ring of P-type connectors positioned adjacent to, and encompassing, each group of ESD diodes. In another example, in FIG. 4, the P-type connectors are positioned to form two concentric rings of P-type connectors adjacent to an inner edge and the outer edges of the ESD diode array pair.

The approaches to positioning the P-type connectors adjacent to the ESD diode array pair displayed in FIGS. 4 and 5 are intended for illustration purposes only, and as such, are not intended to limit the embodiments disclosed within this specification. Further, the manner in which the P-type connectors can be positioned adjacent to the ESD diode array pair can vary according to the needs of the circuit design. In one embodiment, the P-type connectors may not surround the ESD diode array pair. For example, the P-type connectors may be positioned along a single edge of the ESD diode array pair or in a horse shoe pattern along three edges of ESD diode array pair.

Positioning of the P-type connectors can be influenced by the desire to meet ESD protection requirements of the circuit design. Additionally, the positioning of the P-type connectors may not alter the location of the centroid of each ESD diode array of the ESD diode array pair from the common centroid. Otherwise, the location of the P-type connectors can be determined by the requirements of the IC within which the circuit design is implemented.

In step 525, at least one additional device array can be positioned adjacent to an outer edge of the P-type connectors positioned in step 520. For example, the additional device array(s) can be positioned along a perimeter that encompasses the device array pair, the ESD diode array pair, and any P-type connectors. The perimeter, further, can include any other spacing required to meet design rules of the manufacturing process used to implement the IC and/or any additional devices or spacing required to meet performance parameters of the circuit. Any additional device arrays can be positioned to share the common centroid. In this manner, the symmetry and matching of all devices within the circuit can be maintained or improved.

The flowchart in the figures illustrates the architecture, functionality, and operation of possible implementations of systems, methods, and computer program products according to various embodiments of the present invention. In this regard, each block in the flowchart may represent a module, segment, or portion of code, which comprises one or more portions of computer-usable program code that implements the specified logical function(s).

For example, the embodiments disclosed within this specification may be implemented as one or more intellectual property (IP) cores that may be available for use within a larger system. An IP core can include a predetermined set of configuration bits that program a programmable IC to perform one or more functions. Alternatively, an IP core can include source code or schematics that describe the logic and connectivity of a design. Some cores include an optimally floorplanned layout targeted to a specific family of programmable ICs. IP cores can also be parameterizable, i.e., allowing the user to enter parameters to activate or change certain core functionality.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and computer instructions.

Embodiments of the present invention can be realized in hardware, software, or a combination of hardware and software. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

A "computer," e.g., a data processing system or a computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to generate a programmatic description of the circuits and/or systems described herein. Examples of computer-usable or computer-readable media can include, but are not limited to, optical media, magnetic media, computer memory, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library, a netlist, a hardware descriptive language specification of a system, an IP core, a bitstream, and/or other sequence of instructions designed for execution on a computer system or that program an IC or implement within an IC the embodiments described within this specification.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of protecting a circuit design implemented within an integrated circuit (IC) from electrostatic discharge (ESD), the method comprising:
   positioning a device array pair comprising a first device array and a second device array on the IC to share a common centroid, wherein the first device array and the second device array are matched;
   positioning an ESD diode array pair comprising a first ESD diode array and a second ESD diode array on the IC outside and adjacent to a first perimeter encompassing the device array pair, wherein the first ESD diode array and the second ESD diode array share the common centroid and are matched; and
   coupling a cathode terminal of each ESD diode of the first ESD diode array to an input of the first device array and coupling a cathode terminal of each ESD diode of the second ESD diode array to an input of the second device array.

2. The method of claim 1, further comprising:
   coupling an anode terminal of each ESD diode of the ESD diode array pair to a ground potential of the IC via a P-type connector pair comprising a first P-type connector ring and a second P-type connector ring; and
   positioning the first P-type connector ring to encompass the first perimeter and positioning the second P-type connector ring to encompass a second perimeter, wherein the second perimeter encompasses the device array pair and the ESD diode array pair.

3. The method of claim 1, further comprising:
   coupling an anode terminal of each ESD diode of the ESD diode array pair to a ground potential of the IC via a P-type connector pair comprising a first P-type connector ring and a second P-type connector ring; and
   positioning the first P-type connector ring to surround a first half of the ESD diodes of the first ESD diode array and a first half of the ESD diodes of the second ESD diode array and positioning the second P-type connector ring to surround a second half of the ESD diodes of the first ESD diode array and a second half of the ESD diodes of the second ESD diode array.

4. The method of claim 3, further comprising positioning an additional device array outside and adjacent to a third perimeter encompassing the second P-type connector ring, wherein the additional device array shares the common centroid.

5. The method of claim 1, further comprising implementing each device of the device array pair as a matched device.

6. The method of claim 1, further comprising implementing each ESD diode of the ESD diode array pair as a matched device.

7. The method of claim 1, wherein positioning the ESD diode array pair further comprises implementing each ESD diode array of the ESD diode array pair as a P-well diode, wherein an anode of each ESD diode is formed of a P-type material and a cathode of each ESD diode is formed of an N-type material.

8. A system for protecting a circuit design implemented within an integrated circuit (IC) from electrostatic discharge (ESD), the system comprising:
   a device array pair comprising a first device array and a second device array positioned on the IC sharing a common centroid, wherein the first device array and the second device array are matched; and
   an ESD diode array pair comprising a first ESD diode array and a second ESD diode array positioned on the IC outside and adjacent to a first perimeter encompassing the device array pair, wherein the first ESD diode array and the second ESD diode array share the common centroid and are matched,
   wherein a cathode terminal of each ESD diode of the first ESD diode array is coupled to an input of the first device array and a cathode terminal of each ESD diode of the second ESD diode array is coupled to an input of the second device array.

9. The system of claim 8, further comprising a P-type connector pair comprising a first P-type connector ring and a second P-type connector ring, wherein the P-type connector pair couples an anode terminal of each ESD diode of the ESD diode array pair to a ground potential of the IC, wherein the first P-type connector ring encompasses the first perimeter and the second P-type connector ring encompasses a second perimeter, and wherein the second perimeter encompasses the device array pair and the ESD diode array pair.

10. The system of claim 8, further comprising a P-type connector pair comprising a first P-type connector ring and a second P-type connector ring, wherein the P-type connector pair couples an anode terminal of each ESD diode of the ESD diode array pair to a ground potential of the IC, wherein the first P-type connector ring surrounds a first half of the ESD diodes of the first ESD diode array and a first half of the ESD diodes of the second ESD diode array, and wherein the second P-type connector ring surrounds a second half of the ESD diodes of the first ESD diode array and a second half of the ESD diodes of the second ESD diode array.

11. The system of claim 10, further comprising an additional device array positioned on the IC outside and adjacent to a third perimeter encompassing the second P-type connector ring, wherein the additional device array shares the common centroid.

12. The system of claim 8, wherein each device of the device array pair is matched.

13. The system of claim 8, wherein each ESD diode of the ESD diode array pair is matched.

14. The system of claim 8, wherein:

each ESD diode of the ESD diode array pair is a P-well diode, and an anode of each ESD diode is formed of a P-type material and the cathode of each ESD diode is formed of an N-type material.

15. A system for protecting an N-type metal oxide semiconductor (NMOS) differential amplifier implemented within an integrated circuit (IC) from electrostatic discharge (ESD), the system comprising:

an NMOS input device array pair comprising a first NMOS input device array and a second NMOS input device array of the differential amplifier, positioned on the IC sharing a common centroid, wherein the first NMOS input device array and the second NMOS input device array are matched, and each NMOS input device array of the NMOS=input device array pair comprises a plurality of NMOS input devices, wherein each NMOS input device of the NMOS input device array pair is matched; and an ESD diode array pair comprising a first ESD diode array and a second ESD diode array positioned on the IC outside and adjacent to an outer edge of the NMOS input device array pair, wherein the first ESD diode array and the second ESD diode array share the common centroid and are matched and each ESD diode array of the ESD diode array pair comprises a plurality of ESD diodes, wherein each ESD diode of the ESD diode array pair is matched, wherein a cathode terminal of each ESD diode of the first ESD diode array is coupled to a gate terminal of each NMOS input device of the first NMOS input device array and a cathode terminal of each ESD diode of the second ESD diode array is coupled to a gate terminal of each NMOS input device of the second NMOS input device array.

16. The system of claim 15, further comprising a P-type connector array pair comprising a first P-type connector array and a second P-type connector array, wherein the P-type connector array pair couples an anode terminal of each ESD diode to a ground potential of the IC, and wherein the first P-type connector array surrounds a first half of the ESD diodes of the first ESD diode array and a first half of the ESD diodes of the second ESD diode array, and the second P-type connector array surrounds a second half of the ESD diodes of the first ESD diode array and a second half of the ESD diodes of the second ESD diode array.

17. The system of claim 15, further comprising a P-type connector array pair comprising a first P-type connector array and a second P-type connector array, wherein the P-type connector array pair couples an anode terminal of each ESD diode of the ESD diode array pair to a ground potential of the IC, and wherein the first P-type connector array encompasses the NMOS input device array pair and the second P-type connector array encompasses the ESD diode array pair.

18. The system of claim 15, further comprising an NMOS current source device array positioned outside and adjacent to a perimeter encompassing the NMOS input device array pair and the ESD diode array pair, wherein the NMOS current source device array shares the common centroid and each NMOS current source device of the NMOS current source device array is matched.

19. The system of claim 18, wherein a drain terminal of each NMOS current source device of the NMOS current source device array is coupled to a drain terminal of each other NMOS current source device of the NMOS current source device array as well as a source terminal of each NMOS input device of the NMOS input device array pair.

20. The system of claim 15, wherein each ESD diode of the ESD diode array pair is a P-well diode, wherein an anode of each ESD diode is formed of a P-type material and the cathode of each ESD diode is formed of an N-type material.

\* \* \* \* \*